United States Patent
Mulloy et al.

(10) Patent No.: US 10,303,405 B2
(45) Date of Patent: May 28, 2019

(54) PRINTER SERVICING

(71) Applicant: Hewlett-Packard Development Company, L.P., Houston, TX (US)

(72) Inventors: Michael Mulloy, Leixlip (IE); William Jon Rittgers, Celbridge (IE); Odhran Hendley, Bray (IE); Bryan Murphy, Lucan (IE); Eduardo Macias, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/781,215

(22) PCT Filed: Apr. 1, 2016

(86) PCT No.: PCT/US2016/025513
§ 371 (c)(1),
(2) Date: Jun. 4, 2018

(87) PCT Pub. No.: WO2017/171832
PCT Pub. Date: Oct. 5, 2017

(65) Prior Publication Data
US 2018/0349072 A1 Dec. 6, 2018

(51) Int. Cl.
*G06F 3/12* (2006.01)
*G06F 11/07* (2006.01)
*G06Q 10/00* (2012.01)
*B41J 2/045* (2006.01)

(52) U.S. Cl.
CPC ........ *G06F 3/1219* (2013.01); *B41J 2/04553* (2013.01); *B41J 2/04566* (2013.01); *G06F 3/121* (2013.01); *G06F 3/1229* (2013.01); *G06F 3/1235* (2013.01); *G06F 3/1285* (2013.01);
(Continued)

(58) Field of Classification Search
CPC ...... G06F 3/1219; G06Q 10/20; G03G 21/20; B41J 2/04553; B41J 2/04563; B41J 2/04566
USPC ..... 358/1.9, 1.14, 1.15, 504; 399/11, 44, 94, 399/97
See application file for complete search history.

(56) References Cited

U.S. PATENT DOCUMENTS

| | | | |
|---|---|---|---|
| 5,519,419 A * | 5/1996 | Stephany | B41J 2/04563 347/19 |
| 6,587,647 B1 | 7/2003 | Watanabe et al. | |
| 8,238,763 B2 | 8/2012 | Kim | |

(Continued)

FOREIGN PATENT DOCUMENTS

WO   WO-2013-147314 A1   10/2013

OTHER PUBLICATIONS

Ubiquitech. Cloud Printing for Managed Service Provider. Mar. 12, 2015. 4 pages.

*Primary Examiner* — Jamares Q Washington
(74) *Attorney, Agent, or Firm* — HP Inc. Patent Department

(57) ABSTRACT

In one example of the disclosure, environmental data indicative of an environmental factor measured at a printer is received via a network. The receipt of the environmental data is via an authorized non-anonymous data flow from the printer. Instructions for a service event to occur at the printer are determined based upon the environmental data. The service event instructions are sent, via the network, to the printer to cause the printer to perform the service event.

14 Claims, 7 Drawing Sheets

(52) U.S. Cl.
   CPC ........ *G06F 3/1288* (2013.01); *G06F 11/0733* (2013.01); *G06Q 10/20* (2013.01)

(56) References Cited

U.S. PATENT DOCUMENTS

| | | |
|---|---|---|
| 2006/0092452 A1 | 5/2006 | Simpson |
| 2008/0316527 A1 | 12/2008 | Lee |
| 2010/0253729 A1 | 10/2010 | Mitsuzawa |
| 2012/0307263 A1 | 12/2012 | Ichikawa et al. |
| 2013/0100197 A1 | 4/2013 | Donahue et al. |
| 2014/0185096 A1 | 7/2014 | Tokunaga |
| 2015/0009527 A1 | 1/2015 | Mochizuki |
| 2015/0242172 A1 | 8/2015 | Murphy et al. |
| 2015/0242176 A1 | 8/2015 | Naik et al. |
| 2016/0098234 A1* | 4/2016 | Weaver ................ G06F 3/1234 358/1.15 |
| 2016/0124828 A1* | 5/2016 | Moore ................ G06F 11/3068 702/182 |

\* cited by examiner

PRINTER SERVICING

BACKGROUND

In current printing systems, printers are expected to achieve long lives across a broad spectrum of working conditions. In order to provide good printer reliability servicing (e.g., cleaning and maintenance) routines for the printer's marking agent delivery components are needed.

DRAWINGS

DETAILED DESCRIPTION

Figure 1:
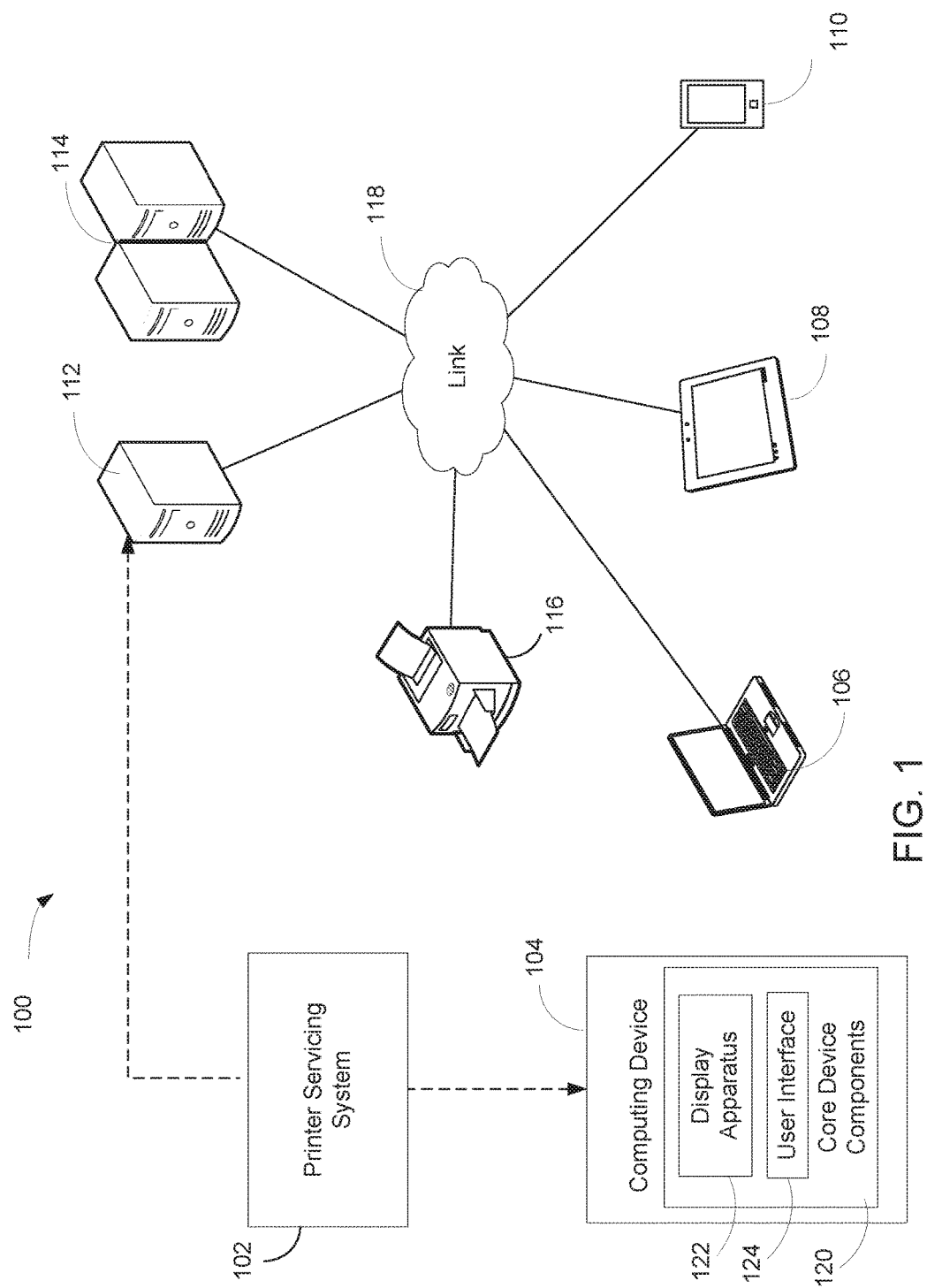
FIG. 1 is a block diagram depicting an example environment in which various examples of the disclosure may be implemented.

INTRODUCTION: Servicing needs for printers and the marking agents delivery systems included in the printers vary significantly according to the ambient environment in which the printer operates. For instance, a printer operating in an environment of high temperature and low humidity (e.g., 35 degrees C. and 20% relative humidity) will need more servicing events than a printer operating in an environment of relatively low temperature and high humidity (e.g., 15 degrees C. and 80% relative humidity).

Currently, many printer providers ship printers that are configured to perform service routines that will maintain printer and marking agent delivery system health over a wide range of ambient temperatures and humidities. Providers typically will not know the precise ambient condition in which a particular printer will be operated in at the time of manufacture or sale. As a result, many providers will tune the servicing aspects of the printer to the most aggressive servicing levels to ensure the printer will operate in the challenging conditions. This can result in waste in supplies (e.g., marking agent used a servicing event), energy, and time associated with unnecessary servicing routines, as printers operating in benign environments may be performing service routines designed to enable printing in high temperature and/or low humidity environments.

To address these issues, various examples described in more detail below provide a system and a method for printer servicing. In an example, a printer servicing system receives via a network, e.g., an internet, environmental data indicative of an environmental factor measured at a printer that is also connected to the network. The environmental data is received at the printer servicing system via an authorized non-anonymous data flow from the printer. In examples, the authorized non-anonymous data flow is a flow previously authorized by a user of the printer. In particular examples, the authorized data flow is relative to marking agent consumption at the printer according to a marking agent subscription service, e.g. a protocol authorizing use of marking agent installed at the printer according to a subscription. In examples, the environmental data is received at the printer along with subscription data for the printer according to the authorized non-anonymous data flow. The subscription data is indicative of a subscription for consumption of marking agent at the printer. In examples, the received environmental data may include temperature data and or humidity data measured at the printer. The printer servicing system determines, based upon the received environmental data, instructions for a service event to occur at the printer. The printer servicing system in turn sends to the printer, via the network, the service event instructions, the instructions to cause the printer to perform the service event.

In other examples of the disclosure, a network-connected printer includes a processor and a sensor, the sensor to measure an environmental factor at the printer. In examples, the printer may include a temperature sensor and/or a humidity sensor. In a particular example, the temperature sensor may be temperature sensor included within a printhead at the printer. The printer is configured to send, via the network, to a printer servicing service external to the printer, environmental data indicative of the environmental factor. The printer sends the environmental data to the printer servicing service via a previously authorized non-anonymous data flow from the printer. In examples, the authorized non-anonymous data flow includes data indicative of marking agent consumption at the printer. In other examples, the authorized non-anonymous data flow includes data that is interpreted by the printer to authorize utilization of marking agent stored at the marking agent retention component in a printing operation or servicing event. In turn the printer receives, via the network, service event instructions for a service event (e.g., a marking agent spitting operation, a marking agent pumping operation, and/or a wiping operation) to be performed at the printer. The service event instructions are instructions that were determined at the printer servicing service based upon the environmental data. The printer then causes performance of the service event in accordance with the received instructions.

In this manner, the disclosed examples provide for a cost-effective and efficient method and system for printer servicing that can leverage an existing non-anonymous date flows relating to a marking agent subscription service. By utilizing such non-anonymous data flows, instructions for servicing a printer can be determined in view of ambient environmental information for a specific printer. Users of printers, and the providers of the printer and marking agent according to the subscription services should each appreciate the reduced costs, time savings, and increased document quality to be enjoyed with utilization of the disclosed examples.

The following description is broken into sections. The first, labeled "Environment," describes an environment in which various examples may be implemented. The second section, labeled "Components," describes examples of various physical and logical components for implementing various examples. The third section, labeled "Illustrative Example," presents an example of printer servicing. The fourth section, labeled "Operation," describes implementation of various examples.

ENVIRONMENT: FIG. 1 depicts an example environment 100 in which examples may be implemented as a system 102 for printer servicing. Environment 100 is shown to include computing device 104, client devices 106, 108, and 110, server device 112, server devices 114, and printer 116. Components 104-116 are interconnected via link 118.

Link 118 represents generally an infrastructure or combination of infrastructures to enable an electronic connection, wireless connection, other connection, or combination thereof, to enable data communication between components 104-116. Such infrastructure or infrastructures may include, but are not limited to, a cable, wireless, fiber optic, or remote connections via telecommunication link, an infrared link, or a radio frequency link. For example, link 118 may represent the internet, intranets, and intermediate routers, switches, and other interfaces. As used herein, a "computing device" may be a server, computer networking device, chip set, desktop computer, notebook computer, workstation, tablet computer, smartphone or another processing device or equipment. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106, 108, and 110 represent generally a computing device with which a user may interact to communicate with other client devices, server device 112, server devices 114, and/or printer 116 via link 118. Server device 112 represents generally a computing device to serve a program and corresponding data for consumption by components 104-110, 114 and 116. Server devices 114 represent generally a group of computing devices collectively to serve a program and corresponding data for consumption by components 104-110, 112, and 116.

Computing device 104 represents generally a computing device with which a user may interact to communicate with client devices 106-110, server device 112, server devices 114, and/or printer 116 via link 118. Computing device 104 is shown to include core device components 120. Core device components 120 represent generally the hardware and programming for providing the computing functions for which device 104 is designed. Such hardware can include a processor and memory, a display apparatus 122, and a user interface 124. The programming can include an operating system and applications. Display apparatus 122 represents generally a combination of hardware and programming to exhibit or present a message, image, view, or other presentation for perception by a user, and can include, but is not limited to, a visual, tactile or auditory display. In examples, the display apparatus 122 may be or include a monitor, a touchscreen, a projection device, a touch/sensory display device, or a speaker. User interface 124 represents generally a combination of hardware and programming to enable interaction between a user and device 104 such that the user may effect operation or control of device 104. In examples, user interface 124 may be, or include, a keyboard, keypad, or a mouse. In some examples, the functionality of display apparatus 122 and user interface 124 may be combined, as in the case of a touchscreen apparatus that may enable presentation of displays of electronic documents or images at device 104, and that also may enable a user to operate or control functionality of device 104.

Printer 116 represents generally any computing device configured to produce a physical printed representation of an image. Printer 116 may be a multifunction device that can perform a function such as scanning and/or copying in addition to printing. In examples, printer 116 may be a printer located in a printing system located in a commercial print provider facility. In other examples printer 116 may be a printer located in a home. In examples printer 116 may be thermal inkjet printer, a piezoelectric inkjet printer, a latex ink printer, a solid ink printer, a laser printer, or any other type of Eprinter that ejects a marking agent or marking agents to form an image. Printer 116 includes hardware and programming for providing printing functions. Printer 116 may include an operating system to cause the printer to interpret print data, and a printing element to cause the application of one or more marking agents upon a media according to mapping provided by print data, to thereby form an image upon a media.

In examples, printer 116 is a printer configured to receive communications and print jobs over link 118, e.g., a cloud-based printing service. In examples, printer 116 may include one or more marking agents that may be locked and unlocked according to a marking agent subscription that authorizes use of the marking agent for printing operations (e.g., printing content and/or servicing the printer). As used herein a "cloud-based service" refers generally to a service that is accessible from a computing device over a network such as the internet.

System 102, discussed in more detail below, represents generally a combination of hardware and programming for printer servicing. In some examples, system 102 may be wholly integrated within core device components 120. In other examples, system 102 may be implemented as a component of computing vice 104, client devices 106-110, server device 112, server devices 114, or printer 116 where it may take action based in part on data received from core device components 118 via link 118. In other examples, system 102 may be distributed across computing device 104, client devices 106-110, server device 112, server devices 114, or printer 116.

Figure 2A:
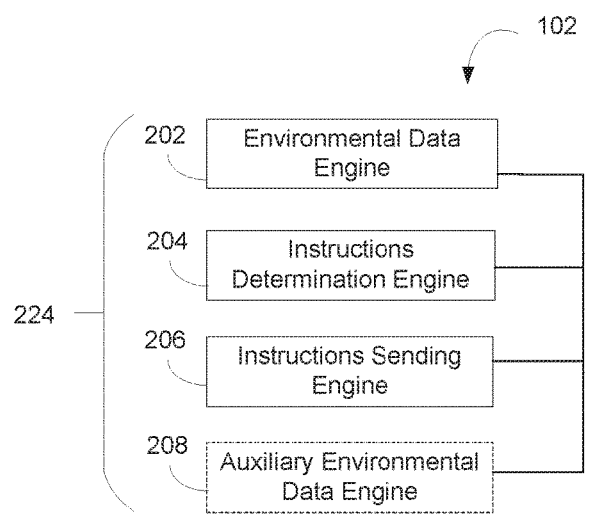
FIGS. 2A and 2B are block diagrams depicting examples of a printer servicing system.
Figure 2B:
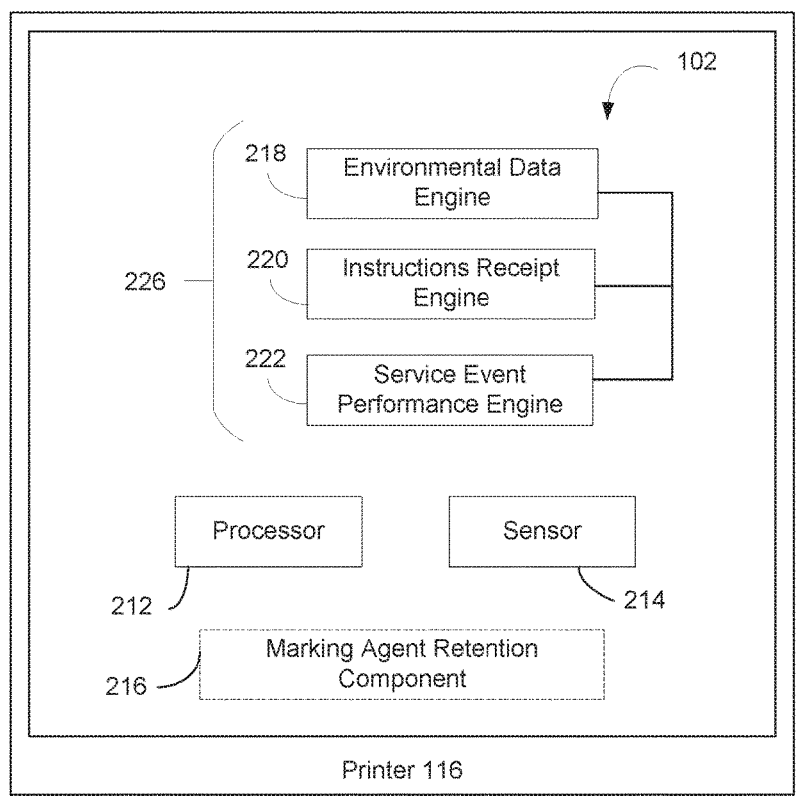

COMPONENTS: FIGS. 2A, 2B, 3A and 3B depict examples of physical and logical components for implementing various examples. In FIGS. 2A and 2B various components are identified as engines 202, 204, 206, 208, 218, 220, and 222. In describing engines 202-208 and 218-222 focus is on each engine's designated function. However, the term engine, as used herein, refers generally to a combination of hardware and programming to perform a designated function. As is illustrated later with respect to FIGS. 3A and 3B, the hardware of each engine, for example, may include one or both of a processor and a memory, while the programming may be code stored on that memory and executable by the processor to perform the designated function.

FIG. 2A is a block diagram depicting components of a printer servicing system 102. In this example, system 102 includes environmental data engine 202, instructions determination engine 204, instructions sending engine 206, and auxiliary environmental data engine 208. In performing their respective functions, engines 202-208 may access a data repository, e.g., a memory accessible to system 102 that can be used to store and retrieve data.

In an example, environmental data engine 202 represents generally a combination of hardware and programming to receive, via a network (e.g., link 118) environmental data indicative of an environmental factor measured at a printer 116. As used herein an "authorized non-anonymous data flow" refers generally to flow of data from a printer that identifies the printer and/or a user of the printer, wherein the flow was authorized by a user of the printer. In examples, an "authorized non-anonymous data flow" may identify with respect to a printer one or more of a printer name, model, number, IP address, geography, times of use, frequency of use, pages printed, types of content printed, etc. In examples, a "authorized non-anonymous data flow" may authorized by a user of the printer that is an administrator user. In examples, an "authorized non-anonymous data flow" may include a data relating to marking agent consumption at the printer according to a marking agent subscription service.

As used herein, "marking agent" refers generally to any substance that includes a pigment and can be applied upon a media by a printer during a printing operation, including but not limited to aqueous inks, solvent inks, UV-curable inks, dye sublimation inks, latex inks, liquid electrophotographic inks, liquid or solid toners, and powders. "Pigment" refers generally to a coloring matter, including, but not limited to insoluble powders, to be mixed with water, oil, or another base to produce an ink or other fluid. In examples a marking agent may be, but it is not limited to, a black marking agent with a black pigment, a cyan marking agent with a cyan pigment, a magenta marking agent with a magenta pigment, or a yellow marking agent with a yellow pigment. An "ink" refers generally to any fluid that is to be applied to a media during a printing operation.

In examples, the marking agent subscription service may be a service wherein a user enters into a subscription agreement with a marking agent provider such that a number of pages of content are authorized for printing at the printer utilizing ink installed at the printer. In other examples, the marking agent subscription service may be a service wherein a user enters into a subscription agreement with a marking agent provider such that a volume of ink at the printer is authorized for use in printing or servicing operations at the printer. Other variations of marking agent subscription services are possible and are contemplated by this disclosure. In a particular example, environmental data engine 202 is to receive the environmental data along with subscription data for the printer.

In examples, the received environmental data may include temperature data, humidity data, or other data relating to an environmental factor (e.g., temperature and/or of humidity) for a printer. In an example, the environmental data is data with respect to a humidity factor at the printer, and the environmental data is collected at the printer via a humidity sensor included within the printer. In another example, the environmental data is data with respect to a temperature factor at the printer, and the environmental data is collected at the printer via a temperature sensor included within the printer.

In an example, the environmental data may be data with respect to a temperature factor at the printer, and the environmental data may be collected at the printer via a temperature sensor included within a printhead installed at the printer. As used herein, a "printhead" refers generally to a component having a plurality of nozzles through which a marking agent, marking agents, pretreatment fluid, or other fluid is ejected. Examples of printheads are drop on demand inkjet printheads, such as piezoelectric printheads and thermo resistive printheads. Some printheads may be part of a cartridge which also stores the fluid to be dispensed. Other printheads are standalone and are supplied with fluid by an off-axis fluid supply. In a particular example, the environmental data may be data with respect to a temperature factor at the printer, wherein the environmental data is collected at the printer via a temperature sensor included within a printhead installed at the printer, with the temperature measurement occurring after a predetermined time has elapsed following a printing event. The predetermined time is to allow printhead temperature to equilibrate with ambient temperature, such that the temperature measurement will be an accurate measurement of printer ambient environment versus a printing operating environment.

In examples, environmental data engine 202 may receive the environmental data via an authorized non-anonymous data flow from the printer over a link 116 via a networking protocol. In examples the networking protocol may include, but is not limited to, Transmission Control Protocol/Internet Protocol ("TCP/IP"), HyperText Transfer Protocol ("HTTP"), and/or Session Initiation Protocol ("SIP").

Continuing at FIG. 2A, instructions determination engine 206 represents generally a combination of hardware and programming to determine, based upon the environmental data, instructions for a service event to occur at the printer. In examples, the instructions may be in any computer language, or in any messaging format or metadata format, that can be interpreted by the printer 116.

Continuing at FIG. 2A, instructions sending engine 209 represents generally a combination of hardware and programming to send to the printer, via the network (e.g. link 118), the service event instructions that were determined by instructions determination engine 206. The service event instructions are to cause the printer to perform the service event designated in the service event instructions. In examples, instructions sending engine 208 may send the service event instructions to the printer over a link 116 via a networking protocol. In examples the networking protocol may include, but is not limited to, Transmission Control Protocol/Internet Protocol ("TCP/IP"), HyperText Transfer Protocol ("HTTP"), and/or Session Initiation Protocol ("SIP").

In certain examples, system 102 may additionally include an auxiliary environmental data engine 208. Auxiliary environmental data engine 208 represents generally a combination of hardware and programming to receive auxiliary environmental data (e.g., humidity data and/or temperature data) that is indicative an environmental parameter at a device on the network other than the printer. In examples, the network device other than the printer may be a smart thermostat located in a same building as the printer. As used herein, a "smart thermostat" refers generally to a combination of hardware and programming that is connected to a network, e.g., an internet, and is responsible for controlling temperature in at least a portion of a building or any other container. In an example, a smart thermostat may be a device that permits controlling temperature according to a schedule and/or via another network-connected device, e.g. a smart phone or tablet computer connected to the network. In examples, the network device may be a smart thermostat located in a same room as, or located within a prescribed or predetermined distance from, the printer. In examples, auxiliary environmental data engine 208 may receive auxiliary environmental data over a link 116 via a networking protocol. In examples the networking protocol may include, but is not limited to, Transmission Control Protocol/Internet Protocol ("TCP/IP"), HyperText Transfer Protocol ("HTTP"), and/or Session Initiation Protocol ("SIP").

In examples instructions determination engine 204 may in turn determine the service event instructions based upon the printer environmental data received by environmental data engine 202 and based upon the auxiliary environmental data received by auxiliary environmental data engine 208.

FIG. 2B is a block diagram depicting components of a printer servicing system 102 included within a printer 116. In an example, printer 116 includes a processor 212, a sensor 214 for measuring an environmental factor at printer 116, a marking agent retention component 216, and a print servicing system 102. In this example, system 102 includes environmental data engine 218, instructions receipt engine 220, and service event performance engine 222. In performing their respective functions, engines 218-222 may access a data repository, e.g., a memory accessible to system 102 that can be used to store and retrieve data.

In an example, environmental data engine 218 represents generally a combination of hardware and programming to send, via a network (e.g., link 118) to a printer servicing service environmental data indicative of an environmental factor measured by the sensor 214 at printer 116. Environmental data engine 218 is to send the environmental data a via a previously authorized non-anonymous data flow from printer 116.

Continuing with the example of FIG. 2B, instructions receipt engine 220 represents generally a combination of hardware and programming to receive, via the network, service event instructions for a service event to be performed at printer 116. The service event instructions are instructions that were determined at the printer servicing service based upon the environmental data that environmental data engine 218 sent to the printer servicing service. In certain examples, the service event instructions are instructions for a servicing event that consumes marking agent, e.g., a spitting service operation to maintain health of a printhead, a pumping service operation to maintain health of a printhead, or any printhead priming event. In other examples, the service event instructions are instructions for a servicing event that does not consume marking agent, e.g., a wiping operation to maintain health of a printhead.

Continuing with the example of FIG. 2B, service event performance engine 222 represents generally a combination of hardware and programming to cause performance of the service event in accordance with the instructions received by instructions receipt engine 220.

In examples, environmental data engine 218 may send the printer servicing service environmental data via a previously authorized non-anonymous data flow from printer 116 wherein the flow includes data indicative of marking agent consumption at printer 116. In certain examples, system 102 may include a marking agent retention component 216. In examples, the previously authorized non-anonymous data flow from printer 116 includes a data that is interpreted by printer 116 to authorize utilization of marking agent stored at the marking agent retention component 2216 for or in a printing operation or servicing event at printer 116.

With reference back to FIG. 1 in view of FIGS. 2A and 2B, in one example system 102 may include a cloud print service component 224 that includes engines 202-208 operating on server device 112 (or another device shown or not shown in FIG. 1) and/or a printing device component 226 that includes engines 218-222 operating on printer 116 (or another printer not shown in FIG. 1). In other examples, system 102 may include engines 202-208 and/or engines 218-222 included within, or distributed across, any one or several of computing device 104, client devices 106-110, server device 112, server devices 114, and/or printer 116.

In the foregoing discussion of FIGS. 2A and 2B, engines 202-208 and 218-222 were described as combinations of hardware and programming. Engines 202-208 and 218-222 may be implemented in a number of fashions. Looking at FIGS. 3A and 3B, the programming may be processor executable instructions stored on a tangible memory resource 330 and the hardware may include a processing resource 340 for executing those instructions. Thus memory resource 330 can be said to store program instructions that when executed by processing resource 340 implement system 102 of FIGS. 2A and 2B.

Memory resource 330 represents generally any number of memory components capable of storing instructions that can be executed by processing resource 340. Memory resource 330 is non-transitory in the sense that it does not encompass a transitory signal but instead is made up of more or more memory components to store the relevant instructions. Memory resource 330 may be implemented in a single device or distributed across devices. Likewise, processing resource 340 represents any number of processors capable of executing instructions stored by memory resource 330. Processing resource 340 may be integrated in a single device or distributed across devices. Further, memory resource 330 may be fully or partially integrated in the same device as processing resource 340, or it may be separate but accessible to that device and processing resource 340.

In one example, the program instructions can be part of an installation package that when installed can be executed by processing resource 340 to implement system 102. In this case, memory resource 330 may be a portable medium such as a CD, DVD, or flash drive or a memory maintained by a server from which the installation package can be downloaded and installed. In another example, the program instructions may be part of an application or applications already installed. Here, memory resource 330 can include integrated memory such as a hard drive, solid state drive, or the like.

Figure 3A:
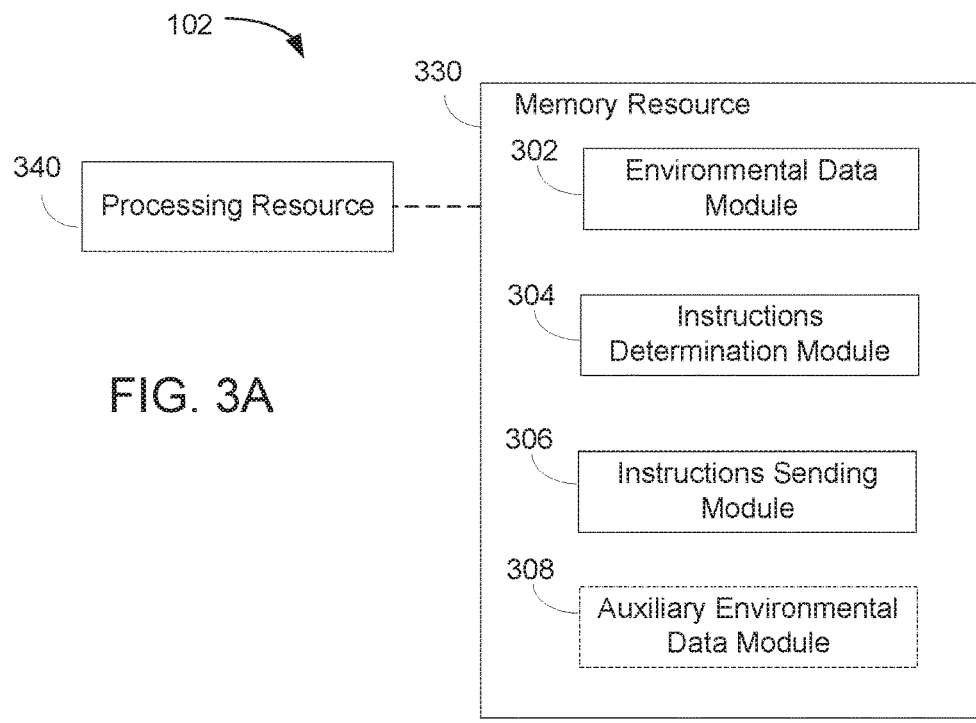
FIGS. 3A and 3B are block diagrams depicting a memory resource and a processing resource to implement examples of a printer servicing system.

In FIG. 3A, the executable program instructions stored in memory resource 330 are depicted as environmental data module 302, instructions determination module 304, instructions sending module 306, and auxiliary environmental data module 308. Environmental data module 302 represents program instructions that when executed by processing resource 340 may perform any of the functionalities described above in relation to environmental data engine 202 of FIG. 2A. Instructions determination module 304 represents program instructions that when executed by processing resource 340 may perform any of the functionalities described above in relation to instructions determination engine 204 of FIG. 2A. Instructions sending module 306 represents program instructions that when executed by processing resource 340 may perform any of the functionalities described above in relation to instructions sending engine 206 of FIG. 2A. Auxiliary environmental data module 308 represents program instructions that when executed by processing resource 340 may perform any of the functionalities described above in relation to auxiliary environmental data engine 208 of FIG. 2A.

Figure 3B:
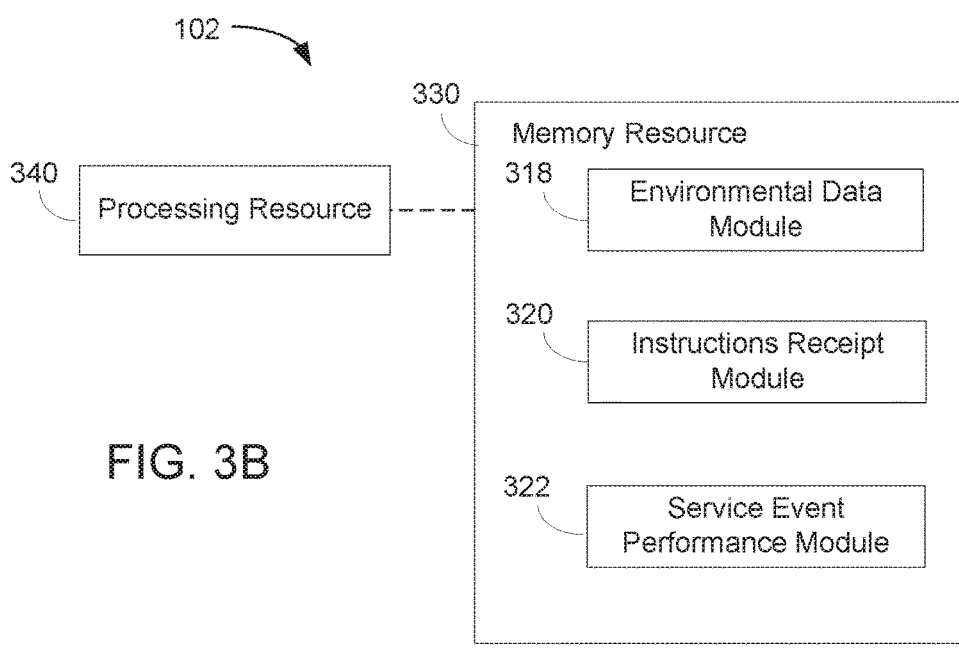

In FIG. 3B, the executable program instructions stored in memory resource 330 are depicted as environmental data module 318, instructions receipt module 320, and service event performance module 322, and auxiliary environmental data module 308. Environmental data module 318 represents program instructions that when executed by processing resource 340 may perform any of the functionalities described above in relation to environmental data engine 218 of FIG. 2B. Instructions receipt module 320 represents program instructions that when executed by processing resource 340 may perform any of the functionalities described above in relation to instructions receipt engine 220 of FIG. 2B. Service event performance module 322 represents program instructions that when executed by processing resource 340 may perform any of the functionalities described above in relation to service event performance engine 222 of FIG. 2B.

Figure 4:
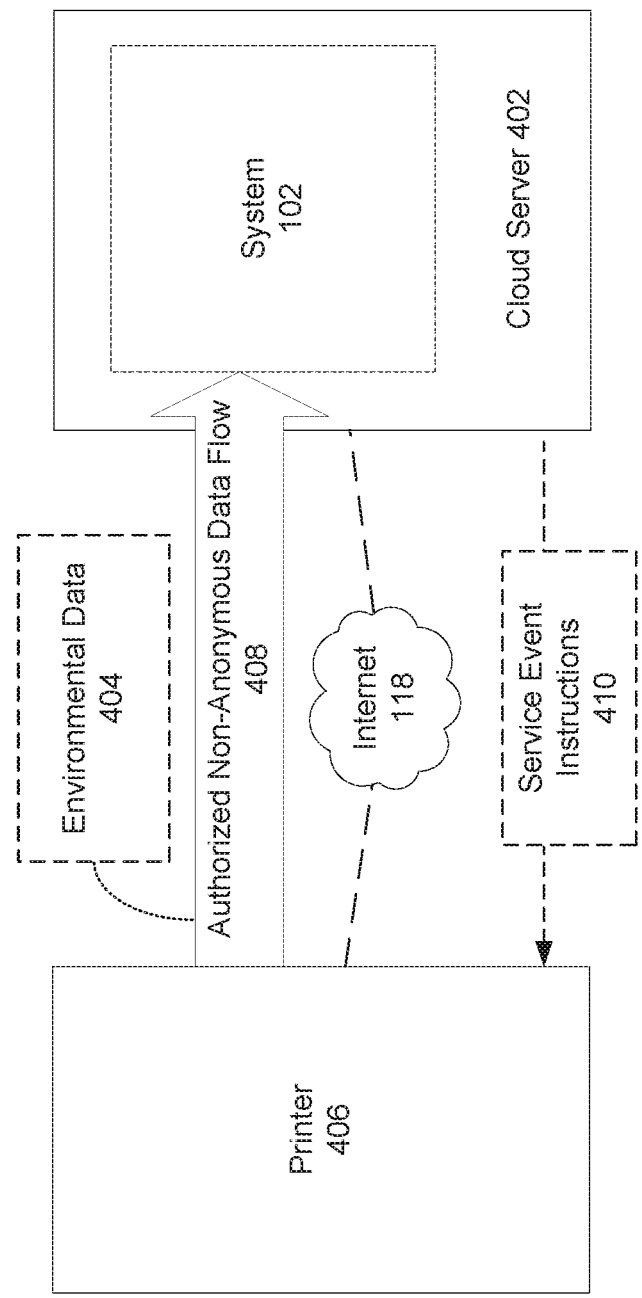
FIG. 4 illustrates an example of a printer servicing system.

ILLUSTRATE EXAMPLE: FIG. 4, in view of FIGS. 1, 2A, and 3A illustrates an example of a system 102 for printer servicing. In examples, system 102 may be hosted at a computing device such as server device 112 (FIG. 1) or distributed over a set of computing devices such as server system 114 (FIG. 1). In examples, system 102 may be included within a cloud server system that is electronically connected to a printer 116 (FIG. 1) via an internet or other network (link 118). In examples, system 102 may be included within a printer 116 that is electronically connected to a cloud server system via an internet or other network (link 118).

Starting at FIG. 4, in this example of system 102 at cloud server 402 receives via an internet 118 environmental data 404. The environmental data is data indicative of an environmental factor (e.g., ambient temperature or humidity) measured at a printer 406. System 102 receives environmental data 404 via an authorized non-anonymous data flow 408 from printer 406. System 102 determines, based upon environmental data 404, instructions 410 for a service event to occur at printer 404. System 102 sends, via internet 118, service event instructions 410 to printer 406 to cause printer 406 to perform the service event described in, or the subject of, the instructions 410.

Figure 5:
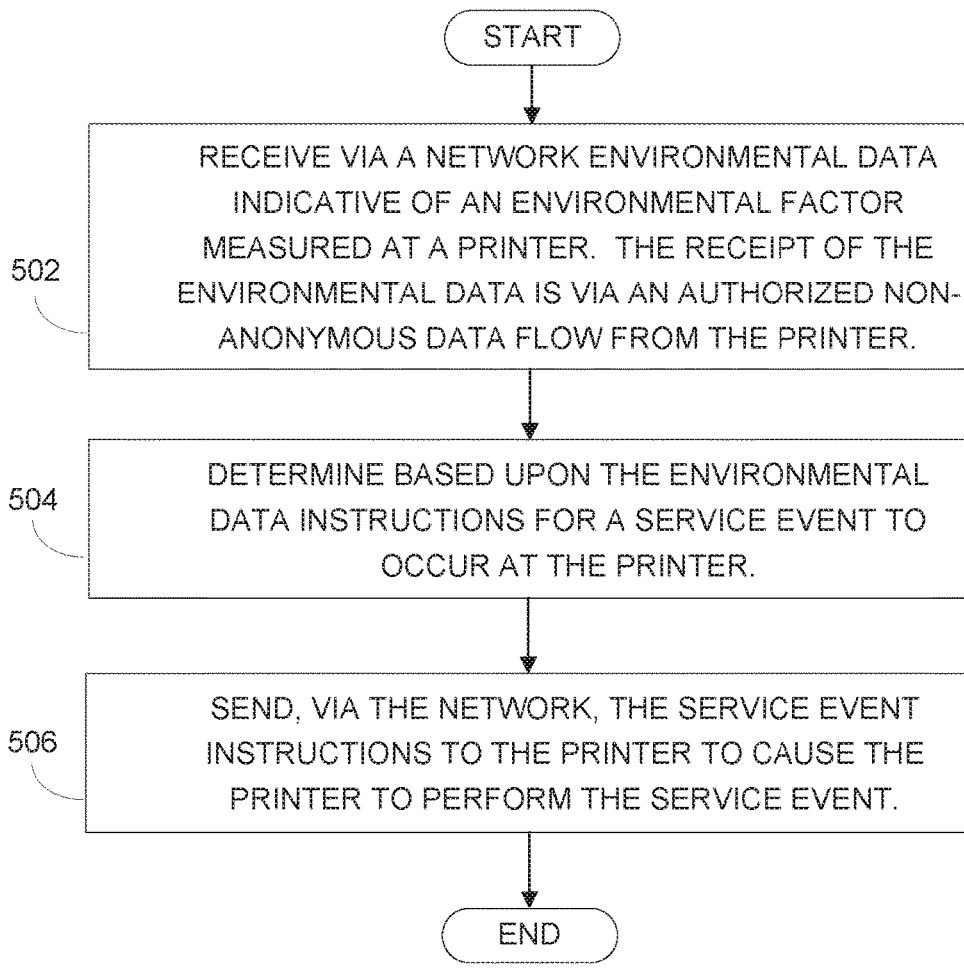
FIG. 5 is a flow diagram depicting implementation of an example of a method for printer servicing.

OPERATION: FIG. 5 is a flow diagram of implementation of a method for printer servicing. In discussing FIG. 5, reference may be made to the components depicted in FIGS. 2A and 3A. Such reference is made to provide contextual examples and not to limit the manner in which the method depicted by FIG. 5 may be implemented. Environmental data indicative of an environmental factor measured at a printer is received via a network. The environmental data is received via an authorized non-anonymous data flow from the printer (block 502). Referring back to FIGS. 2A and 3A, environmental data engine 202 (FIG. 2A) or environmental data module 318 (FIG. 3A), when executed by processing resource 340, may be responsible for implementing block 502.

Instructions for a service event to occur at the printer are determined based upon the environmental data (block 504). Referring back to FIGS. 2A and 3A, instructions determination engine 204 (FIG. 2A) or instructions determination module 304 (FIG. 3A), when executed by processing resource 340, may be responsible for implementing block 504.

The service event instructions are sent to the printer via the network. The service event instructions are to cause the printer to perform the service event (block 506). Referring back to FIGS. 2A and 3A, instructions sending engine 206 (FIG. 2A) or instructions sending module 306 (FIG. 3A), when executed by processing resource 340, may be responsible for implementing block 506.

Figure 6:
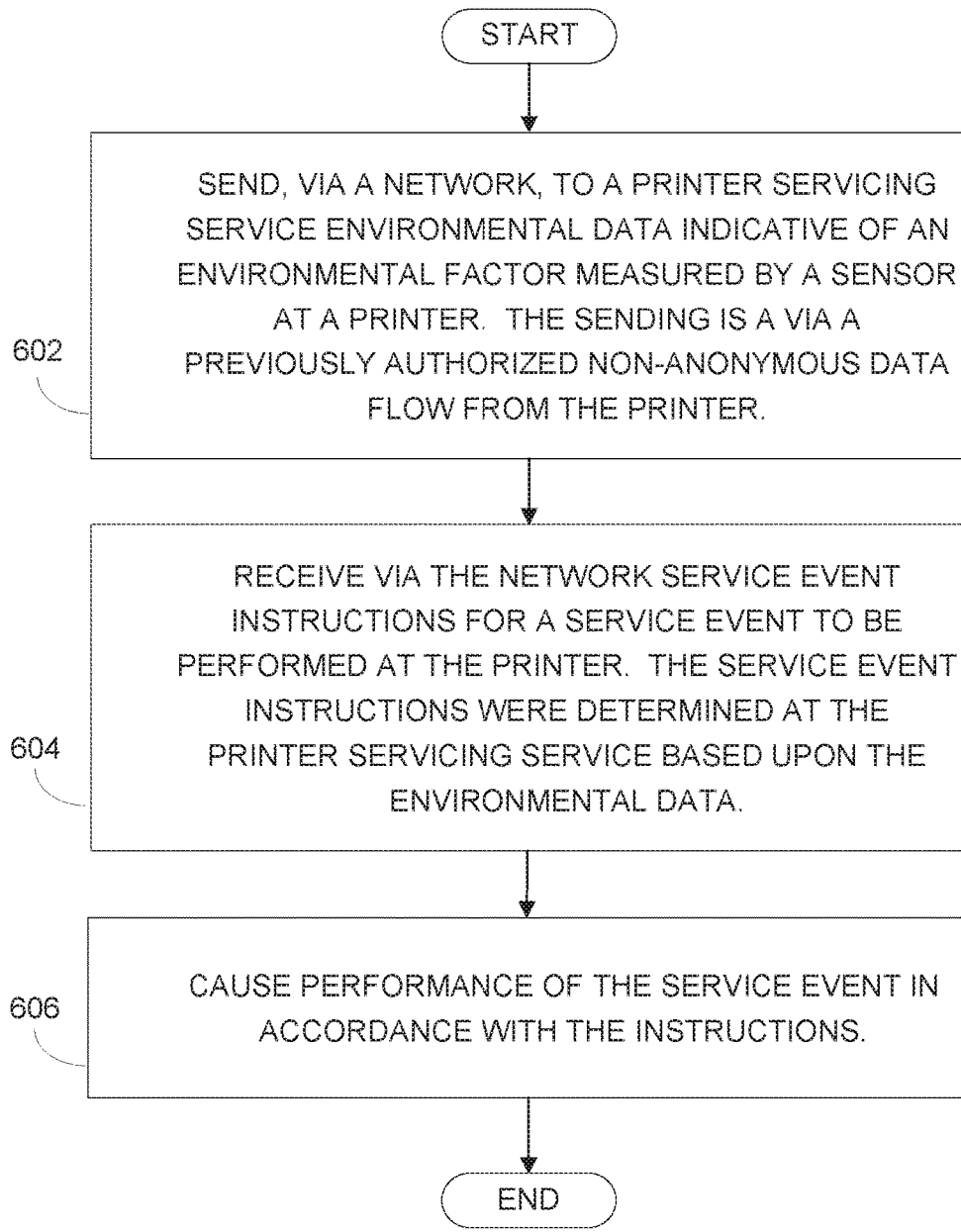
FIG. 6 is a flow diagram depicting implementation of an example of a method for printer servicing.

FIG. 6 is a flow diagram of implementation of a method for printer servicing. In discussing FIG. 6, reference may be made to the components depicted in FIGS. 2A and 3A. Such reference is made to provide contextual examples and not to limit the manner in which the method depicted by FIG. 6 may be implemented. A printer sends environmental data indicative of an environmental factor to a printer servicing service. The sending is via a previously authorized non-anonymous data flow from the printer across a network (block 602). Referring back to FIGS. 2A and 3A, environmental data engine 218 (FIG. 2A) or environmental data module 318 (FIG. 3A), when executed by processing resource 340, may be responsible for implementing block 602.

Service event instructions for a service event to be performed at the printer are received via the network. The service event instructions were determined at the printer servicing service based upon the environmental data (block 604). Referring back to FIGS. 2A and 3A, instructions receipt engine 220 (FIG. 2A) or instructions receipt module 320 (FIG. 3A), when executed by processing resource 340, may be responsible for implementing block 604.

The service event is caused to be performed in accordance with the instructions (block 606). Referring back to FIGS. 2 and 3, service event performance engine 222 (FIG. 2A) or service event performance module 322 (FIG. 3A), when executed by processing resource 340, may be responsible for implementing block 606.

Figure 7:
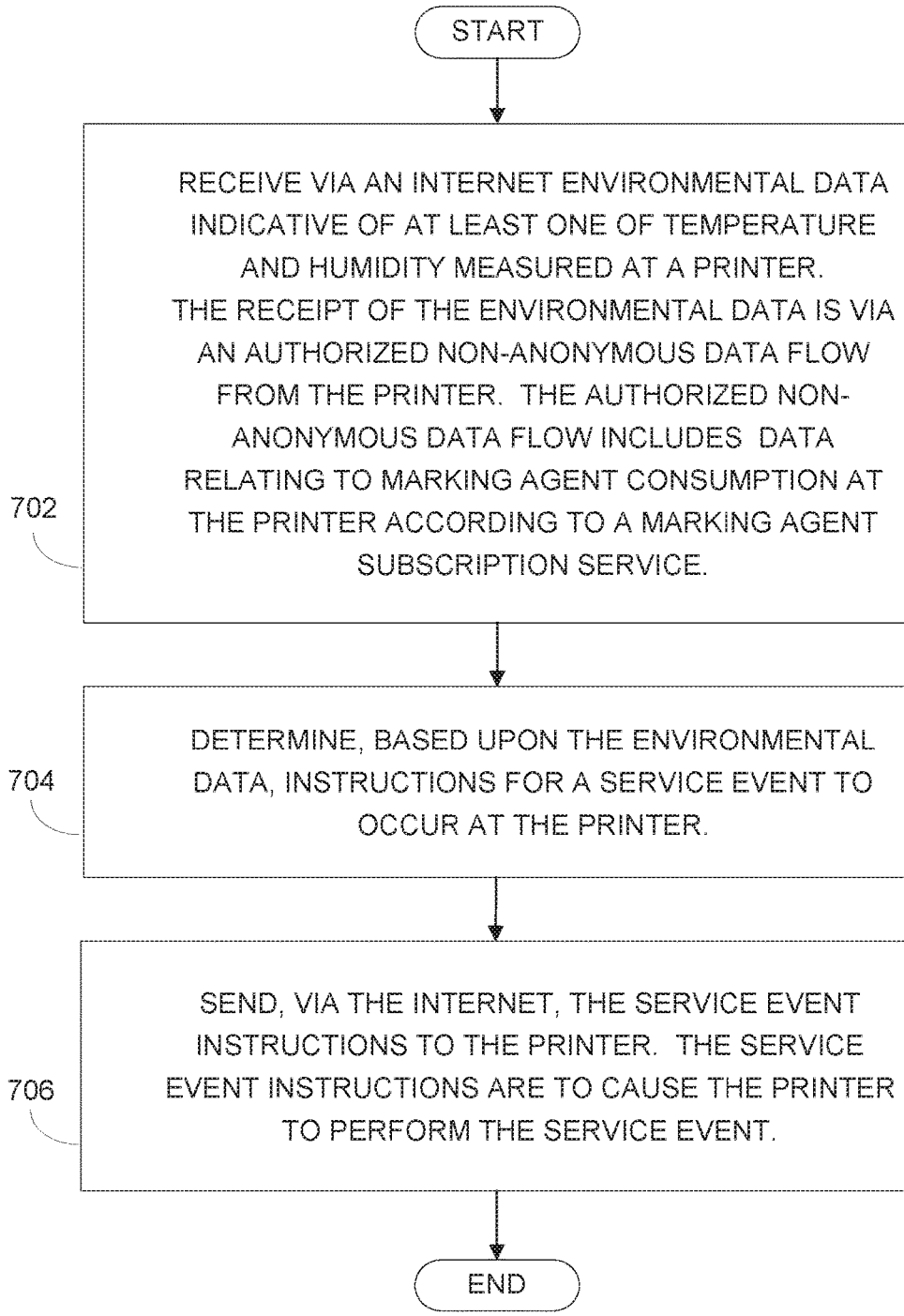
FIG. 7 is a flow diagram depicting implementation of an example of a method for printer servicing, wherein an authorized non-anonymous data flow from the printer includes data relating to marking agent consumption at the printer according to a marking agent subscription service.

FIG. 7 is a flow diagram of implementation of a method for creating printer servicing, wherein an authorized non-anonymous data flow from the printer includes data relating to marking agent consumption at the printer according to a marking agent subscription service. In discussing FIG. 7, reference may be made to the components depicted in FIGS. 2A and 3A. Such reference is made to provide contextual examples and not to limit the manner in which the method depicted by FIG. 7 may be implemented. Environmental data indicative of at least one of temperature and humidity measured at a printer is received via an internet. The receipt of the environmental data is via an authorized non-anonymous data flow from the printer, including data relating to marking agent consumption at the printer according to a marking agent subscription service (block 702). Referring back to FIGS. 2A and 3A, environmental data engine 202 (FIG. 2A) or environmental data module 302 (FIG. 3A), when executed by processing resource 340, may be responsible for implementing block 702.

Instructions for a service event to occur at the printer are determined based upon the environmental data (block 704). Referring back to FIGS. 2A and 3A, instructions determination engine 204 (FIG. 2) or instructions determination module 304 (FIG. 3), when executed by processing resource 340, may be responsible for implementing block 704.

The service event instructions are sent to the printer via the internet to cause the printer to perform the service event (block 706). Referring back to FIGS. 2 and 3, instructions sending engine 206 (FIG. 2A) or instructions sending module 306 (FIG. 3A), when executed by processing resource 340, may be responsible for implementing block 706.

CONCLUSION: FIGS. 1-7 aid in depicting the architecture, functionality, and operation of various examples. In particular, FIGS. 1, 2A, 2B, 3A and 3B depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 5-7 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive.

What is claimed is:

1. A printer servicing system, comprising:
   an environmental data engine, to receive, via a network, printer environmental data indicative of a first environmental factor measured at a printer, wherein the receipt is via an authorized non-anonymous data flow from the printer;
   an auxiliary environmental data engine to receive, from a non-printer device external to the printer, auxiliary environmental data measured by the non-printer device and indicative of a second environmental parameter of a physical environment external to the printer and within which the printer is located;
   an instructions determination engine, to determine based upon the printer environmental data and the auxiliary environmental data instructions for a service event to occur at the printer; and
   an instructions sending engine, to send, via the network, the service event instructions to the printer to cause the printer to perform the service event.

2. The system of claim 1, wherein the authorized non-anonymous data flow is a flow previously authorized by a user of the printer.

3. The system of claim 1, wherein the authorized non-anonymous data flow includes data relating to marking agent consumption at the printer according to a marking agent subscription service between a user of the printer and a provider of marking agent to the printer which authorizes the user to utilize the marking agent with the printer according to specified usage limits.

4. The system of claim 1, wherein the printer environmental data is received with subscription data for the printer, the subscription data indicative of a subscription for consumption of marking agent at the printer.

5. The system of claim 1, wherein the printer environmental data includes temperature data.

6. The system of claim 1, wherein the printer environmental data includes humidity data.

7. The system of claim 1, wherein the non-printer device is a smart thermostat located in a same building as the printer, and wherein the auxiliary environmental data is indicative of an environmental parameter of the same building.

8. The system of claim 1, wherein the network is an internet.

9. A printer, comprising:
   a processor;
   a sensor, to measure a first environmental factor at the printer;
   an environmental data engine, to send via a network to a printer servicing service first environmental data indicative of the first environmental factor, wherein the sending is a via a previously authorized non-anonymous data flow from the printer;
   an instructions receipt engine, to receive via the network service event instructions for a service event to be performed at the printer, the service event instructions having been determined at the printer servicing service based upon the first environmental data and second environmental data received from a non-printer device external to the printer, the second environmental data measured by the non-printer device and indicative of a second environmental parameter of a physical environment external to the printer and within which the printer is located; and
   a service event performance engine, to cause performance of the service event in accordance with the instructions.

10. The printer of claim 9, wherein the first environmental factor is a temperature, and wherein the sensor is a temperature sensor included within a printhead.

11. The printer of claim 10, wherein the temperature sensor is to measure the temperature after a predetermined time has elapsed following a printing event, the predetermined time to allow printhead temperature to equilibrate with ambient temperature.

12. The printer of claim 9,
    further comprising a marking agent retention component; and
    wherein the authorized non-anonymous data flow includes data indicative of marking agent consumption at the printer according to a marking agent subscription service between a user of the printer and a provider of marking agent stored in the marking agent retention component, wherein the subscription service authorizes the user to utilize the marking agent with the printer according to specified usage limits.

13. The printer of claim 9, wherein the servicing event is one from a set of a spitting operation, a pumping operation, and a wiping operation.

14. A method for printer servicing, the method comprising:
    receiving via an internet, printer environmental data indicative of at least one of temperature and humidity measured at a printer,
    wherein the receipt of the printer environmental data is via an authorized non-anonymous data flow from the printer,
    wherein the authorized non-anonymous data flow includes data relating to marking agent consumption at the printer according to a marking agent subscription service between a user of the printer and a provider of marking agent to the printer which authorizes the user to utilize the marking agent with the printer according to specified usage limits;

receiving via the internet, from a non-printer device external to the printer, auxiliary environmental data measured by the non-printer device and indicative of at least one of temperature and humidity of a physical environment external to the printer and within which the printer is located;

determining, based upon the printer environmental data and the auxiliary environmental data, instructions for a service event to occur at the printer; and sending, via the internet, the service event instructions to the printer, the service event instructions to cause the printer to perform the service event.

* * * * *

UNITED STATES PATENT AND TRADEMARK OFFICE
CERTIFICATE OF CORRECTION

PATENT NO. : 10,303,405 B2  
APPLICATION NO. : 15/781215  
DATED : May 28, 2019  
INVENTOR(S) : Michael Mulloy et al.

It is certified that error appears in the above-identified patent and that said Letters Patent is hereby corrected as shown below:

In the Drawings

In sheet 6 of 7, FIG. 6, reference numeral 602, Line 4, delete "A VIA A" and insert -- VIA A --, therefor.

Signed and Sealed this  
Nineteenth Day of November, 2019

Andrei Iancu  
*Director of the United States Patent and Trademark Office*